United States Patent [19]

Tokutomi et al.

[11] 4,171,884
[45] Oct. 23, 1979

[54] ELECTRICALLY CONTROLLED CAMERA DEVICE

[75] Inventors: Seijiro Tokutomi; Masahiro Kawasaki; Yoshio Sawada, all of Tokyo; Katsuhiko Miyata, Omiya, all of Japan

[73] Assignee: Asahi Kogaku Kogyo Kabushiki Kaisha, Tokyo, Japan

[21] Appl. No.: 849,198

[22] Filed: Nov. 7, 1977

[30] Foreign Application Priority Data

Nov. 6, 1976 [JP] Japan .................................. 51-133459

[51] Int. Cl.² ............................................. G03B 17/00
[52] U.S. Cl. ................................. 354/23 D; 354/289
[58] Field of Search ............................. 354/23 D, 289

[56] References Cited

U.S. PATENT DOCUMENTS

| 4,051,489 | 9/1977 | Saito et al. | 354/23 D |
| 4,079,386 | 3/1978 | Murakami et al. | 354/289 |
| 4,081,813 | 3/1978 | Kawamura et al. | 354/289 |

Primary Examiner—Russell E. Adams
Attorney, Agent, or Firm—Sughrue, Rothwell, Mion, Zinn and Macpeak

[57] ABSTRACT

An electrically controlled camera device is disclosed which includes a counter for counting the number of pulses representative of the preferentially selected one exposure condition of a shutter speed and a diaphragm aperture level to control the preferentially selected one exposure condition, and a digital operation circuit for calculating the other exposure condition in the form of a number of digital pulses in accordance with the output pulses from the counter and with digital data signals representative of the sensed scene brightness and the film sensitivity used. During automatic exposure, the number of pulses counted by the counter is controlled by the combination of a pulse generator and a single-throw mechanical switch connected between the pulse generator and the counter, and the number of output digital pulses from the digital operation circuit is counted by another counter for controlling the other exposure condition. During manual exposure, the number of pulses representative of the other exposure condition is controlled by the combination of the pulse generator and another single-throw mechanical switch and counted by the other counter coupled to the pulse generator through an automatic/manual change-over switch and the other single-throw mechanical switch and controlling the other exposure condition. Both the single-throw mechanical switches are arranged to be operated by corresponding push buttons mounted outside the camera housing, and two sets of indicator lamps for displaying both the exposure conditions are arranged within the field of view of the camera finder.

7 Claims, 3 Drawing Figures

ELECTRICALLY CONTROLLED CAMERA DEVICE

BACKGROUND OF THE INVENTION

The present invention relates to an improvement in an electrically controlled camera device in which one exposure condition of the shutter speed and the diaphragm aperture level is preferentially selected and the other exposure condition is electrically controlled in accordance with the sensed scene brightness and the film sensitivity used.

The external operating members for setting the aperture stop value and the shutter speed in the prior art electrically controlled cameras generally comprise a stop ring and a shutter dial, respectively as in the conventional mechanically controlled cameras. For this reason, the prior art electrically controlled cameras have the disadvantages that it is difficult to attain a further miniaturization and compact configuration, and that the settings of aperture stop value and shutter speed are time-consuming, complicated and troublesome.

SUMMARY OF THE INVENTION

It is therefore an object of the invention to provide an improved electrically controlled camera device which can easily attain the greatest possible miniaturization and compact configuration and which enables the settings of aperture stop value and shutter speed to be accomplished as easily and quickly as possible.

The object of the invention is attained by an electrically controlled camera device in which the settings of aperture stop value and shutter speed are each adapted to be accomplished by the combination of a pulse generator and a single-throw mechanical switch coupled to the output of the pulse generator.

DETAILED DESCRIPTION OF THE PREFERRED EMBODIMENT

Figure 1:
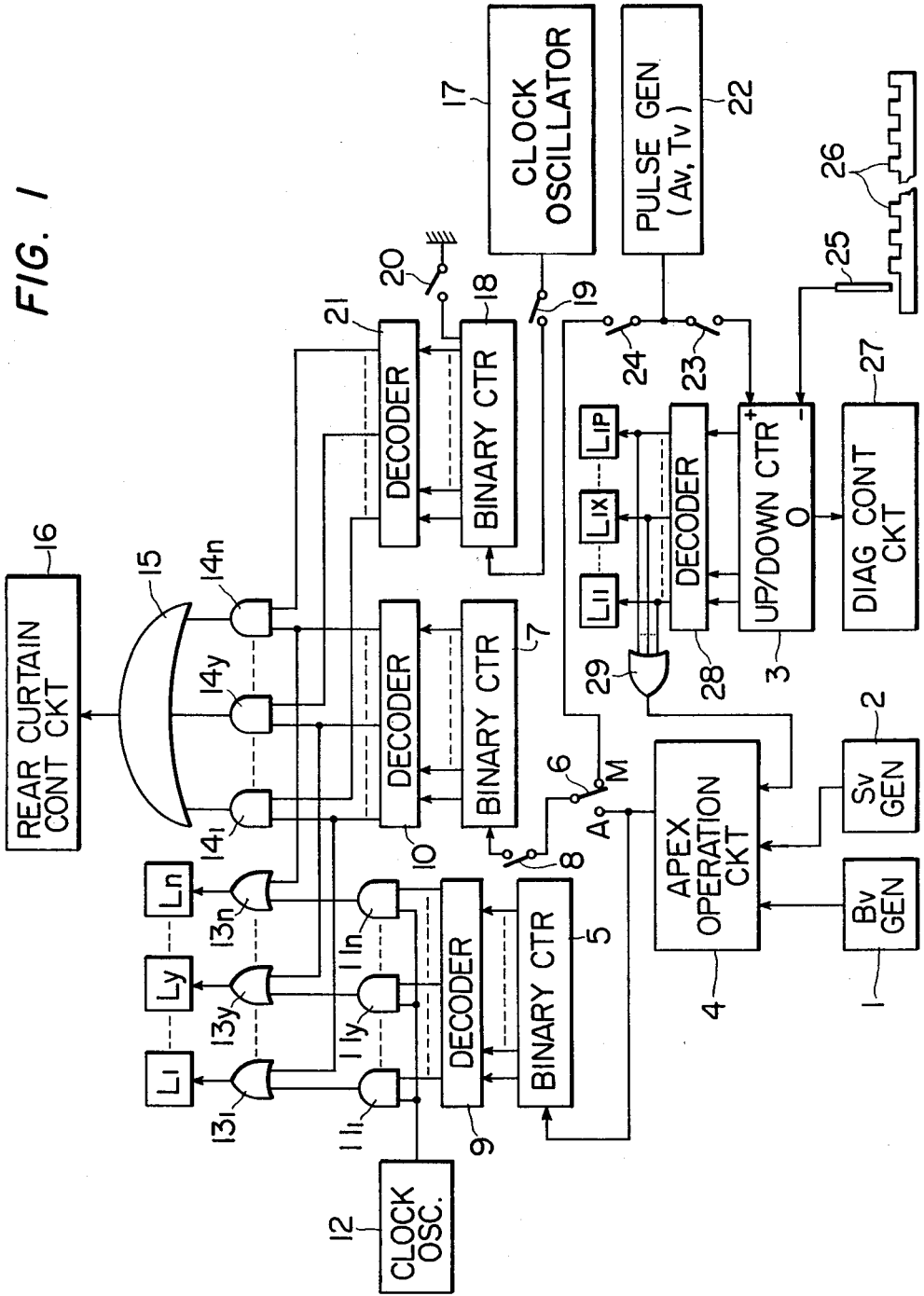
FIG. 1 is a schematic block diagram of an electrically controlled camera device of an aperture preferred type according to one embodiment of the invention.

In FIG. 1, reference numeral 1 designates a sensed scene brightness generating circuit (hereinafter referred to as "Bv generator") for producing a number of digital pulses Bv proportional to the sensed scene brightness, and reference numeral 2 denotes a film speed value generating circuit (hereinafter referred to as "Sv generator") for producing a number of digital pulses Sv proportional to the film sensitivity used. As is well known in the art, the Bv generator 1 can be constituted, for example, by a conventional light measuring circuit operative to produce an analogue signal proportional to the logarithmic value of the brightness of an object to be photographed, and an A-D converter operative to convert the analogue signal from the light measuring circuit into the corresponding digital signal. The Sv generator 2 may comprise, for example, a manually operated storage device of k, for example 4 digits. The digital pulses Bv and Sv from the Bv and Sv generators 1 and 2 are applied, together with an aperture stop value Av from a reversible or up/down counter 3 preferentially selected in the hereinafter described manner, to an APEX operation circuit 4 for calculating a desired correct exposure condition (the shutter speed in this embodiment) in the form of digital pulses Tv having a number representing one of the predetermined n-steps (n is an integer) of shutter speed values in response to the applied Bv, Sv and Av values. A more specific construction for a circuit portion uncluding Bv and Sv generators 1 and 2, reversible counter 3 and APEX operation circuit 4 is disclosed in, for example, Japanese Patent Public Disclosure No. 87645/75 filed by the same applicant on Dec. 5, 1973 and published on July 14, 1975 for public inspection. Thus, output digital pulses Tv from the APEX operation circuit 4 are successively applied directly to a first binary counter 5 having a plurality of binary weighted output terminals and also applied via an automatic/manual change-over switch 6 to a second binary counter 7 identical in construction to the first binary counter 5. The second binary counter 7 is provided with a normally open switch 8 closed to accumulate a count and then opened to latch the contents therein just before the camera shutter is released. The outputs of the first and second binary counters 5 and 7 are respectively coupled with decoders 9 and 10 each having a plurality of output terminals equal in number (n, in this embodiment) to that of the maximum number of digital pulses Tv derived from the APEX operation circuit 4. The respective output terminals of the decoder 9 are connected to one input terminal of the corresponding one of a plurality of two input AND gates $11_l \ldots 11_y \ldots 11_n$ the other input terminals of which are connected in common to the output terminal of a clock pulse oscillator 12 for producing clock pulses having a predetermined frequency, e.g., 1 to 5 Hz. The respective output terminals of the AND gates $11_l$ to $11_n$ are each connected to one input terminal of the corresponding one of a plurality of two input OR gates $13_l \ldots 13_y \ldots 13_n$. The OR gates $13_l$ to $13_n$ each have the other input terminal connected to the corresponding one of the plural output terminals of the decoder 10, and the output terminal connected to the corresponding one of a plurality of indicator lamps $L_l \ldots L_y \ldots L_n$. Also, the respective output terminals of the decoder 10 are each connected to one input terminal of the corresponding one of a plurality of two input AND gates $14_l \ldots 14_y \ldots 14_n$. The AND gates $14_l$ to $14_n$ have their output terminals connected to the corresponding input terminals of an OR gate 15 with its output terminal connected to a circuit 16 for controlling the rear curtain control magnet (not shown). On one hand, there is provided a clock pulse oscillator 17 for producing clock pulses having a predetermined frequency, e.g. 1 KHz, suitable for defining a shutter speed. Output clock pulses from the oscillator 17 are successively applied to a third binary counter 18 identical in construction to the first and second binary counters 5 and 7 via a normally open switch 19 closed synchronously with the start of the camera front curtain (not shown). The counter 18 is provided with a normally open reset switch 20 actuated as described hereinafter and is coupled with a decoder 21 having the same construction as the decoders 9 and 10. Thus, the respective output terminals of the decoder 21 are each connected to the other input terminal of the corresponding one of the AND gates $14_l$ to $14_n$.

On the other hand, there is provided a pulse generator 22 for producing pulses having a predetermined frequency, e.g., 0.5 to 3 Hz, suitable for setting the desired ones of the aperture stop values Av and shutter speed values Tv which are previously divided into P-steps and n-steps, respectively. The output terminal of the pulse generator 22 is connected to the UP-input terminal of the up/down counter 3 via a normally open single-throw mechanical switch 23 closed during both automatic and manual exposures, and also connected to the fixed contact M of the switch 6 via a normally open single-throw mechanical switch 24 closed during only manual exposure. The counter 3 has its DOWN-input terminal connected to a slidable arm 25 which is slidably engaged with a comb-toothed electrode 26, and has its zero output terminal connected to a circuit 27 for actuating the diaphragm aperture control magnet (not shown). Thus, the respective binary weighted output terminals of the counter 3 are connected to the corresponding input terminals of a decoder 28 having p-output terminals. The respective output terminals of the decoder 28 are each connected to the corresponding one of p-indicator lamps $L_{II}$ ... $L_{Ix}$ ... $L_{Ip}$ and are connected to the corresponding input terminals of an OR gate 29 having an output terminal connected to the associated input terminal of the digital operation circuit 4.

Figure 2:
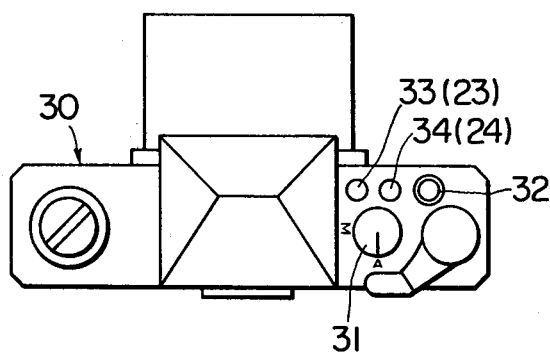
FIG. 2 is a top view of the camera device according to the invention.

FIG. 2 is a top view of a camera housing 30 according to the present invention in which the circuitry shown in FIG. 1 is mounted.

In FIG. 2 reference numerals 31, 32, 33 and 34 designate an operation knob for the automatic/manual change-over switch 6, a shutter release button, and push buttons for the single-throw mechanical switches 23 and 24 respectively mounted at the outside of the camera housing 30.

Figure 3:
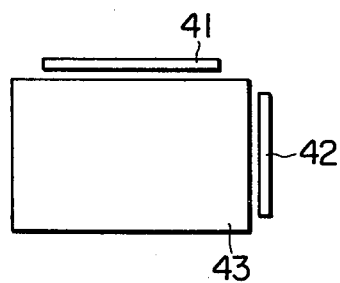
FIG. 3 is a plan view of the finder portion of the camera device shown in FIG. 2.

FIG. 3 is a plan view of the finder portion of the camera device shown in FIG. 2. In FIG. 3 reference numerals 41 and 42 denote an array of said plurality of indicator lamps $L_I$ to $L_n$ and another array of said plurality of indicator lamps $L_{II}$ to $L_{Ip}$ respectively disposed adjacent to the field of view 43 of the finder.

The operation of the camera device constructed as shown in FIGS. 1 to 3 will be described.

First, the automatic/manual change-over switch 6 is transferred to the fixed contact A by the operation knob 31, the latch switch 8 is closed, all the other switches 19, 20, 23 and 24 are each kept open, and the sensed scene brightness value Bv and the film sensitivity value Sv are respectively represented by pulses produced from the Bv and Sv generators 1 and 2.

Assuming, under this condition, that the reversible counter 3 stores a count corresponding to the x-th Av value of the p-steps (x is an integer smaller than P), then the x-th one $L_{Ix}$ fo the indicator lamps $L_{II}$ to $L_{Ip}$ is selectively energized through the decoder 28, whereby the photographer can identify the set Av value through the finder. Thus, only when the content in the counter 3 is desired to be changed, the switch 23 is closed through the push button 33 until the number of pulses stored in the counter 3 becomes equal to that corresponding to the desired Av value. At this time, the number of pulses counted by the counter 3 increases one by one, corresponding to one of the p-steps of the aperture stop values Av, for each one pulse derived through the switch 23 from the pulse generator 22. As a result, digital pulses Tv having a number which corresponds to the Bv, Sv and Av values applied to the APEX operation circuit 4 from the Bv generator 1, the Sv generator 2 and the decoder 28 through the OR gate 29 and which represents one of the n-steps of shutter speed values Tv are produced from the APEX operation circuit 4. Output digital pulses Tv from the APEX operation circuit 4 thus obtained are successively applied to the first and second binary counters 5 and 7. Thus assuming that the number of pulses counted by the counters 5 and 7 be y (y is an integer smaller than n), then the y-th one $L_y$ of the indicator lamps $L_I$ to $L_n$ is selectively energized through the decoders 9, 10, the AND gates $11_I$ to $11_n$ and the OR gates $13_I$ to $13_n$. At this time, the output of the decoder 10 is applied only through the OR gates $13_I$ to $13_n$ to the indicator lamps $L_I$ to $L_n$ and consequently acts to continuously illuminate the energized indicator lamp $L_y$, whereas the output of the decoder 9 is applied through the AND gates $11_I$ to $11_n$ and the OR gates $13_I$ to $13_n$ to the indicator lamps $L_I$ to $L_n$ and consequently acts to intermittently illuminate the energized indicator lamp $L_y$ at the repetition rate determined by the frequency of clock pulses generated by the oscillator 12. The shutter speed value Tv displayed by the illuminated one of the indicator lamps $L_I$ to $L_n$ automatically varies at the optimum value in accordance with the Bv, Sv and Av values applied to the APEX operation circuit 4 from the Bv and Sv generators 1, 2 and the OR gate 29 through the counter 3 and decoder 28, respectively.

Accordingly, the Av value set as mentioned above and the Tv value corresponding the set Av value can be easily adjusted by the manipulation of the push button 33 while observing the illuminated ones of both the arrays of indicator lamps $L_I$ to $L_n$ and $L_{II}$ to $L_{Ip}$ through the camera finder.

Nextly, when the preparation required for photographing is completed through the charging operation of the shutter, then the switch 20 is momentarily closed to reset the third binary counter 18 and immediately thereafter it is reopened, thereby causing the camera rear curtain to be held by the electromagnet (not shown) through the circuit 16.

Nextly, under this condition, the shutter is released and at the same time the switch 8 is opened to latch the contents stored in the second binary counter 7, thereby enabling the contents in the counter 7 to be maintained at the optimum value Tv.

Under this condition, the size of the diaphragm aperture (not shown) is continuously stopped down from its full open position. At this time, the slidable arm 25 is moved along the comb-toothed electrode 26 interlockingly with the stop-down operation of the diaphragm aperture. As a result, one pulse is applied to the DOWN-input terminal of the counter 3 each time the slidable arm 25 is moved by the interval corresponding to one-tooth on the electrode 26.

Thus, the contents x in the counter 3 are reduced by one each time one pulse is applied from the comb-toothed electrode 26 through the slidable arm 25 to the counter 3, and when it becomes zero, then the circuit 27 is made operative to keep in position the diaphragm aperture through an electromagnet (not shown). In other words, the diaphragm aperture is always set at the level corresponding to the Av value initially stored in the counter 3.

Under this condition, the camera front curtain is started and at the same time the switch 19 is closed, whereby the third binary counter 18 starts its counting operation for the clock pulses applied thereto from the oscillator 17 through the now closed switch 19. Thus, when the number of pulses counted by the counter 18 is equal to said y, the corresponding one $14_y$ of the AND gates $14_1$ to $14_n$ is selectively enabled through the counter 18 and decoder 21. Thus, the circuit 16 is made operative through the OR gate 15 to release the camera rear curtain through an electromagnet (not shown) thereby terminating the desired exposure operation for the camera.

DURING MANUAL EXPOSURE

First, the automatic/manual change-over switch 6 is transferred from the fixed contact A to the fixed contact M through the manipulation of the operation knob 31, the latch switch 8 is closed, and all the other switches 19, 20, 23 and 24 are kept opened.

Thus, under this condition, the setting of the Av value representative of the diaphragm aperture value is accomplished by closing the switch 23 through the depression of the push button 33, and the set Av value is displayed by the corresponding one of the indicator lamps $L_{l1}$ to $L_{lp}$ in the same manner as in the case of the automatic exposure.

On the other hand, the setting of the Tv value representative of the shutter time is attained by closing the switch 24 in the similar manner to the switch 23. As a result, the set exposure time Tv value is stored in the second binary counter 7 in the form of the number of clock pulses applied thereto from the oscillator 22 in place of the output digital pulses derived during the automatic exposure from the APEX operation circuit 4.

Thus, during manual exposure, the operations other than the setting of the shutter speed Tv value are substantially the same as in the case of the automatic exposure, except that the shutter time Tv value is represented by the continuous illumination of one of the indicator lamps $L_l$ to $L_n$ as contrasted with the continuous and intermittent illumination as in the case of the automatic exposure.

It should be noted that the present invention is not limited by the embodiment described herein but may be practiced by various modifications common in the technical concept to the present invention. For example, it would be understood by those skilled in the art that the present invention is also applicable to an electrically controlled camera device of a shutter preferred type, and the number of pulses representative of the Av and Tv value to be set may be derived from the generator 22 through the intermittent operation of the corresponding switches 23 and 24. Furthermore, the binary counters 5, 7 and 21 may be each replaced by a single reversible counter.

What we claim is:

1. In an electrically controlled camera device of the type including a first counter means for counting the number of pulses representative of the preferentially selected one exposure condition of a shutter speed and a diaphragm aperture level to control the preferentially selected exposure condition in response to the number of output pulses therefrom and a digital operation circuit for calculating the other exposure condition in the form of a number of digital pulses in dependence with the output pulses from said first counter means and digital data signals representative of the sensed scene brightness and the film sensitivity, the improvement comprising first means for controlling the number of said pulses representative of the preferentially selected one exposure condition, said first means for controlling including the combination of a first pulse generator operative to produce pulses having a predetermined frequency and a first single-throw mechanical switch coupled between said first pulse generator and said first counter means, second counter means coupled through an automatic/manual changeover switch with the output of said digital operation circuit to count the number of output pulses therefrom, wherein the other exposure condition is controlled during automatic exposure in response to the number of output pulses derived from said second counter means through said digital operation circuit when the generating operation of a desired number of pulses from said first pulse generator is terminated through said first single-throw mechanical switch, second means for controlling the other exposure condition during manual exposure, said second means for controlling including the combination of a second pulse generator operative to produce pulses each having a predetermined frequency and a second single-throw mechanical switch coupled through said automatic/manual change-over switch between said second pulse generator and said second counter means.

2. In an electrically controlled camera device as defined in claim 1, the improvement wherein said first pulse generator is concurrently used for said second pulse generator.

3. In an electrically controlled camera device as defined in claim 1, the improvement wherein said automatic/manual change-over switch is manipulated by automatic/manual changeover operation knob mounted on the outside of the housing of said camera device, and said first and second single-throw mechanical switches are respectively manipulated by corresponding push buttons each mounted on the outside of said housing.

4. In an electrically controlled camera device as defined in claim 1, wherein said first and second counter means respectively comprise first and second binary counters, the improvement further comprising first and second decoders coupled to the outputs of said first and second binary counters each having a plurality of output terminals the number of which is equal to the maximum number of pulses counted by said first and second binary counters, respectively; and a plurality of light emitting elements coupled to the corresponding output terminals of each of said first and second decoders.

5. In an electrically controlled camera device as defined in claim 4, the improvement wherein said plurality of light emitting elements are arranged within the field of view of the finder of said camera device.

6. In an electrically controlled camera device as defined in claim 4 of the type further comprising a third counter means which is coupled between the output of said digital operation circuit and said plurality of light emitting elements associated with said second counter means and which includes a third binary counter, and a third decoder coupled to the output of said third binary counter and having a plurality of output terminals corresponding to the maximum number of pulses to be counted by said third binary counter; the improvement further including means for energizing one of said plurality of light emitting elements associated with said second and third counter means simultaneously and distinguishably in response to output counted pulses from said second and third counter means.

7. In an electrically controlled camera device as defined in claim 6, the improvement wherein said means for energizing comprises a plurality of AND gates each having one input terminal connected to the corresponding one of said plurality of output terminals of said third decoder; a clock pulse oscillator operative to produce clock pulses of a predetermined frequency and having an output terminal connected in common to the other input terminals of said plurality of AND gates; and a plurality of OR gates each having one input terminal connected to the output terminal of the corresponding one of said plurality of AND gates, the other input terminal connected to the corresponding one of said plurality of output terminals of said second decoder, and an output terminal connected to the corresponding one of said plurality of associated light emitting elements.

* * * * *